No. 817,187. PATENTED APR. 10, 1906.
S. PALMER & M. M. WATERMAN.
W. G. PALMER, EXECUTOR OF S. PALMER, DEC'D.
APPARATUS FOR MAKING FIBROUS CONDUITS.
APPLICATION FILED MAY 19, 1905.
3 SHEETS—SHEET 1.
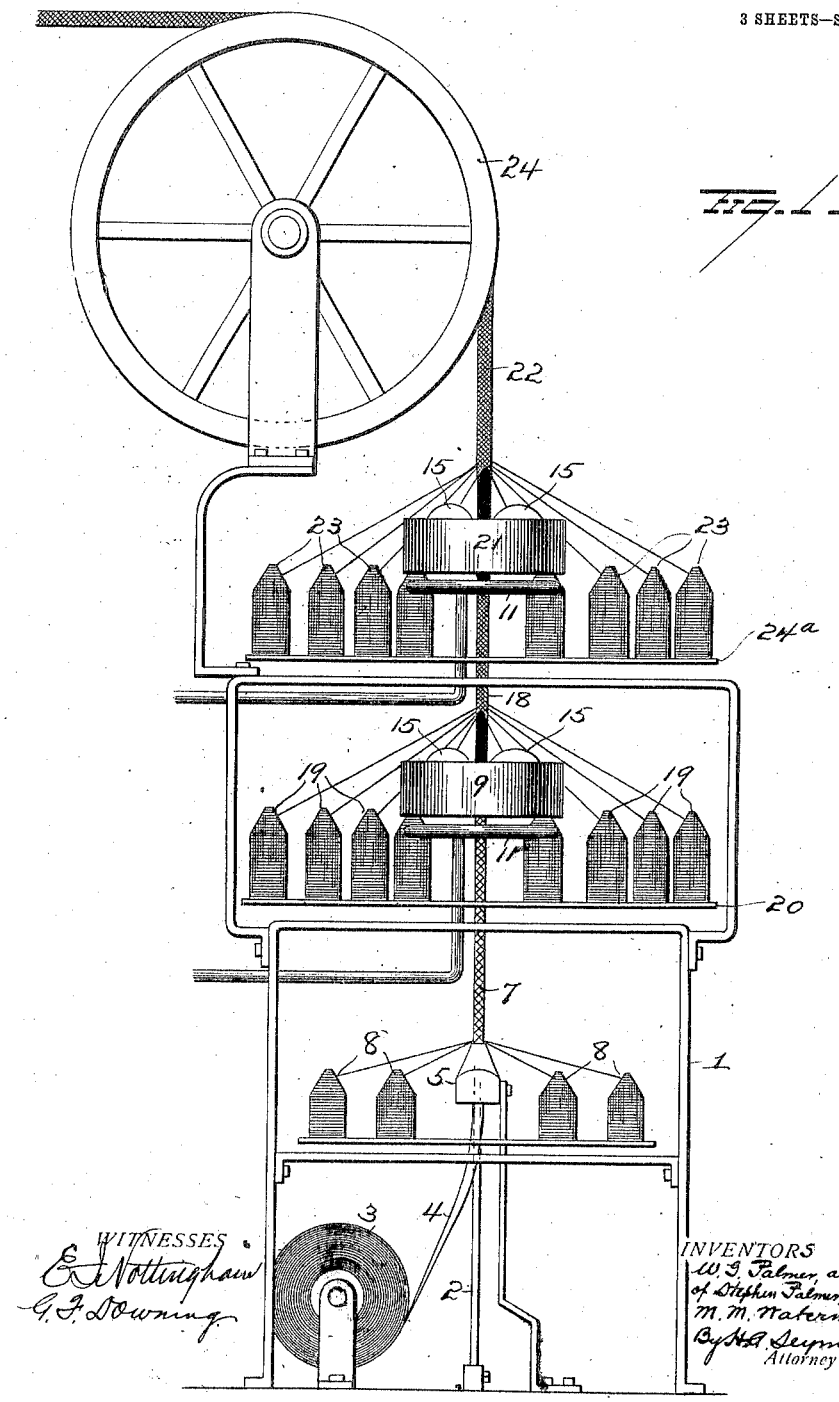

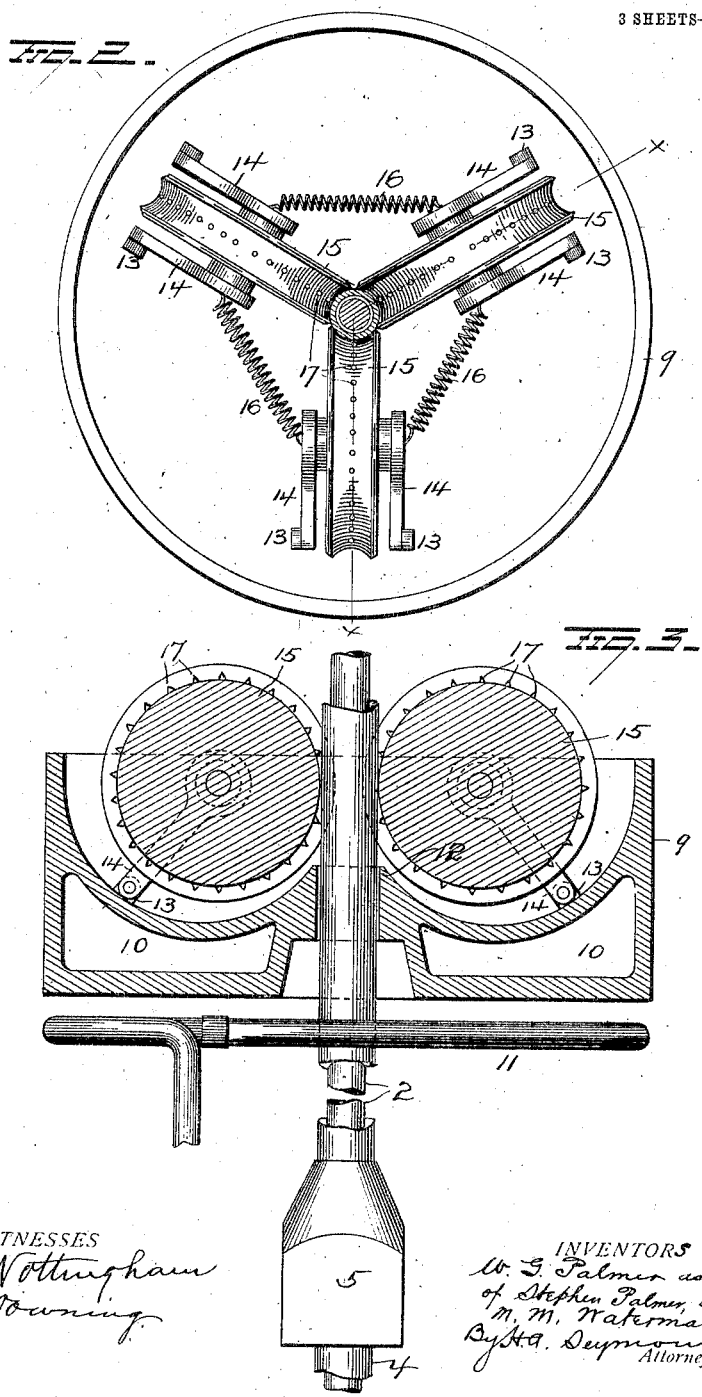

No. 817,187. PATENTED APR. 10, 1906.
S. PALMER & M. M. WATERMAN.
W. G. PALMER, EXECUTOR OF S. PALMER, DEC'D.
APPARATUS FOR MAKING FIBROUS CONDUITS.
APPLICATION FILED MAY 19, 1905.
3 SHEETS—SHEET 3.
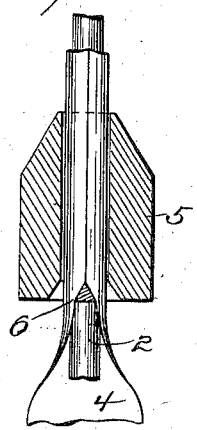
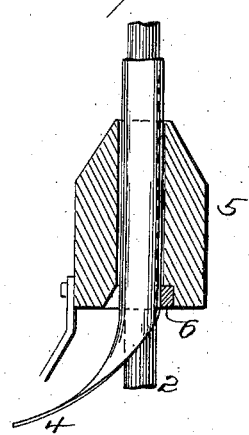
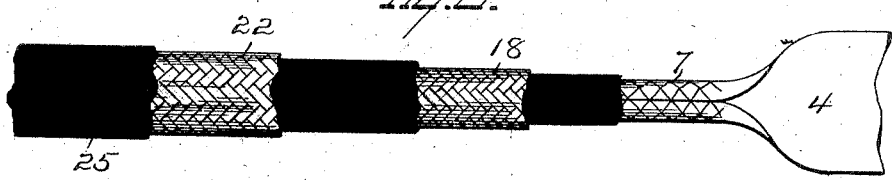
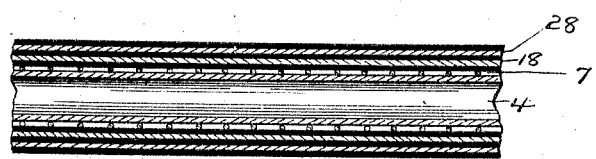

UNITED STATES PATENT OFFICE.

WILLIAM G. PALMER, EXECUTOR OF STEPHEN PALMER, DECEASED, AND MARCUS M. WATERMAN, OF TROY, NEW YORK, ASSIGNORS OF ONE-HALF TO MARCUS M. WATERMAN, ONE-FIFTH TO JAMES K. P. PINE, ONE-TENTH TO GEORGE W. DAW, ONE-TENTH TO JAMES J. CHILD, AND ONE-TENTH TO HERBERT E. NORTHRUP, OF TROY, NEW YORK.

APPARATUS FOR MAKING FIBROUS CONDUITS.

No. 817,187.     Specification of Letters Patent.     Patented April 10, 1906.

Application filed May 19, 1905. Serial No. 261,211.

*To all whom it may concern:*

Be it known that STEPHEN PALMER, deceased, late a citizen of the United States, and a resident of Troy, in the county of Rensselaer and State of New York, did in his lifetime, together with MARCUS M. WATERMAN, of Troy, Rensselaer county, New York, invent certain new and useful Improvements in Apparatus for Making Fibrous Conduits, of which the following is a specification filed by us, WILLIAM G. PALMER, executor of the estate of said STEPHEN PALMER, deceased, and MARCUS M. WATERMAN, residents of Troy, New York, citizens of the United States; and we do hereby declare the following to be a full, clear, and exact description of the invention, such as will enable others skilled in the art to which it appertains to make and use the same.

Our invention relates to an improved apparatus for making fibrous conduits, the object of the invention being to provide improvements of this character in which the tube moves vertically and has alternate layers of braiding and pitch applied thereto automatically; and the invention consists in certain novel features of construction and combinations and arrangements of parts, as will be more fully hereinafter described, and pointed out in the claims.

In the accompanying drawings, Figure 1 is a view in elevation, illustrating our improvements. Fig. 2 is a plan view of one of the pitch-pots. Fig. 3 is a view in section on the line *x x* thereof. Figs. 4 and 5 are views in longitudinal section of the former 5. Fig. 6 is a view in elevation, illustrating the tube formation; and Fig. 7 is a view in longitudinal section, showing the formation of the several tube layers.

1 represents a frame of any suitable construction in which a vertical mandrel 2 is secured and comprises a longitudinally grooved or serrated rod so shaped to reduce friction and rendering easy the longitudinal movement of the tube thereon.

3 represents a spool or supply-roll of tape 4, from which the tape is fed longitudinally to the rod and is curved into cylindrical form around mandrel 2 by a former 5 of general conical shape, having a cylindrical bore with flared lower end and a triangular block 6 set in its lower end to properly guide the converging edges of the tape and prevent turning or twisting of the tube on the mandrel.

The tube formed by cylindrically-curving tape 4 above former 5 receives an open braiding 7, the thread being supplied from a series of bobbins 8 on a rotary platform and properly guided to the tube by the conical shape of the former. After receiving open braiding 7 the tube passes up through an improved pitch-pot 9, (clearly shown in Figs. 3 and 4,) which comprises a casting having a hollow steam-receiving chamber 10 in its bottom, and a gas or other fluid-burning coil 11 is located below the pot 9 to heat the same by such means when desired. The pot has a raised hollow central portion 12, through which the tube passes, and is made with three (more or less) pairs of grooves 13 to receive brackets 14, carrying pitch-applying wheels 15, and said brackets 14 are connected by coiled springs 16 to hold the peripheries of the wheels against the tube. The wheels 15 are made with concave peripheries and are provided with peripheral teeth or prongs 17 to engage the tube and insure the turning of the wheels and the supplying of a pitch coating thereto. Above pitch-pot 9 the tube receives a fine braiding 18, which embeds itself in the hot pitch, the threads being supplied from bobbins 19 on a rotary platform 20. The tube next passes through another pitch-pot 21, similar to pitch-pot 9, to receive another coating of pitch and above pot 21 receives another fine braiding 22, the threads being supplied from bobbins 23 on a rotary platform 24ª. The tube is then drawn over a feed-wheel 24, having a toothed concave periphery to insure the feeding of the tube, and is afterward given a waterproof covering 25 in any desired manner.

It will be observed that our improved apparatus is entirely automatic in its operation. The formation of the tube is continuous, permitting the tube to be cut off in any lengths desired.

A great many slight changes might be made in the general form and arrangement of the parts described without departing from our invention, and hence we would have it understood that we do not restrict ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In an apparatus of the character described, the combination of a longitudinally grooved or serrated mandrel, a former constructed to bring the longitudinal edges of a tape together around said mandrel to form a tube, means for feeding the tube so formed longitudinally of the mandrel, means in the former to prevent turning or twisting of the tube, and means for applying layers or coatings of braiding and pitch to the tube as it is fed along the mandrel.

2. In an apparatus of the character described, the combination of means for forming a tube and feeding it longitudinally, of a pitch-pot through which the tube is passed, and wheels in said pot having their peripheries against the tube and turned by the movement of the tube to supply pitch thereto.

3. In an apparatus of the character described, the combination with means for forming a tube and feeding it longitudinally, of a pitch-pot through which the tube is fed, means for heating the pitch in said pot, and toothed wheels in said pot engaging the tube to apply a coating of hot pitch thereto.

4. In an apparatus of the character described, the combination with means for forming a tube and feeding it longitudinally, of a pitch-pot having a central opening through which the tube is passed, a steam-chamber in the bottom of said pot, a series of brackets supported in grooves in the pot, wheels having concave and toothed peripheries supported by said brackets and engaging the tubes and springs connecting the brackets and holding the wheels in engagement with the tube.

5. In an apparatus of the character described, the combination with a vertical mandrel and means for forming a tape around the mandrel, of means for braiding the tape on the mandrel and means for elevating pitch from a receptacle and depositing it on the braided tube, substantially as set forth.

6. In an apparatus of the character described, the combination with a mandrel, of a former provided with a guide whereby the edges of the strip are guided and the strip is formed into a tube which is restrained against rotary movement, substantially as set forth.

7. In an apparatus of the character described, the combination with a mandrel, and means for forming a tape around the mandrel, of a pitch-pot and wheels mounted on yielding bearings for feeding or applying pitch to the tube, substantially as set forth.

In testimony whereof we have signed this specification in the presence of two subscribing witnesses.

WILLIAM G. PALMER,
*As executor of Stephen Palmer, deceased.*
MARCUS M. WATERMAN.

Witnesses:
FREDERICK W. CAMERON,
WILLIAM J. ROCHE.